United States Patent Office 3,361,625
Patented Jan. 2, 1968

3,361,625
METHOD AND COMPOSITIONS FOR THE CONTROL OF PLANT PATHOGENS WITH MERCURIAL SULFOLANES
Hilary F. Goonewardene, Moorestown, N.J., and Bernard Loev, Broomall, Pa., assignors to Smith Kline & French Laboratories, Philadelphia, Pa., a corporation of Pennsylvania
No Drawing. Filed Jan. 15, 1965, Ser. No. 425,950
8 Claims. (Cl. 167—33)

ABSTRACT OF THE DISCLOSURE

Compositions comprising mercurial sulfolanes having both fungicidal and bactericidal activity, exemplified by 3-acetoxy-mercuri-2-methoxypropyl-3-sulfolanyl ether and 3-acetoxymercuri-2-methoxysulfolane. These compounds are prepared by methods published in the literature.

---

This invention relates to compositions and methods for the control of plant diseases caused by plant pathogens. In still another aspect, it relates to compounds for control of fungi, bacteria and algae.

In accordance with the present invention, it has now been found that certain mercurial sulfolanes are fungicidal and bactericidal, the pesticidal compounds having the general formulas:

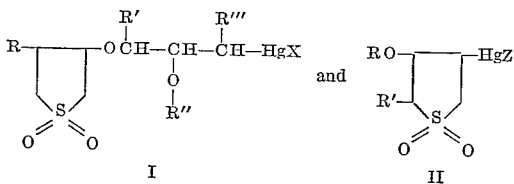

wherein:

R, R', R" and R''' represent hydrogen or lower alkyl to 5 carbon atoms,

X represents an acid salt of the group consisting of halide, sulfate or other inorganic acids, or acetate, benzoate, and other organic acids. Z represents halo or acyl up to 5 carbon atoms.

Advantageous compounds of Formula I are those where R, R' and R''' are all hydrogen.

Advantageous compounds of Formula II are those where R is methyl or ethyl.

There are known substances that are commercially used to combat pathogens in the plant kingdom where their phytotoxic effect is not comparatively great.

Sulfolanes as a class are an extraordinary non-toxic class of compounds, see B. Loev, U.S. Patent No. 3,098,-793 (1963). Contrary to the highly toxic nature of mercurial compounds, the sulfolane mercurial compounds of this invention are non-toxic. Even at doses of 300 mg./kg. P.O., they do not produce toxicity in rats. Therefore, the subject compounds should be much less hazardous to animals when employed against lower organisms according to the present invention.

It has been found that soil fungi and bacteria frequently act together to bring out the onset of plant diseases, and subsequent breakdown of plant tissues. Entrance of the pathogen into plant tissue could be through openings caused either by the activities of biological agents or other non-mechanical means and by mechanical means. An example of pathogen entry through the activity of a biological agent are the nematode punctures of epidermal layers of plant tissue, providing points for entry of pathogens.

For protection of crops against these pathogens various agricultural practices have been employed. Crop rotations have been practiced which include at least one crop which does not serve as host to the pathogens. The use of resistant strains of the crop has occasionally met with some success, but, more frequently, has been a failure when environmental conditions favored the pathogen in contrast to the resistant strain of crop. In many cases infested land must be permanently abandoned insofar as its use for growing the disease-susceptible crop is concerned.

Where the value of the land is high, or where expensive crops are involved, chemical measures for crop protection have been found more economically desirable.

It is an object of this invention to provide a new pesticide composition. A further object is the provision of a new method and composition for treating higher plants and their environment for improved control of undesirable lower plants, e.g. fungi, bacteria and algae.

It has further been found that the sulfolanes of this invention possess remarkable and unexpected bactericidal and bacteriostatic activity and may be used effectively to control various microorganisms.

Exemplary of the substituted sulfolanes useful according to the teaching of this invention are the following:

3-acetoxymercuri-2-methoxypropyl 3-sulfolanyl ether,
3-propionyloxy-2-methoxypropyl 3-sulfolanyl ether,
3-butyryloxy-2-methoxypropyl 3-sulfolanyl ether,
3-acetoxymercuri-2-methoxysulfolane,
3-chloromercuri-2-methoxysulfolane,
3-bromomercuri-2-methoxysulfolane,
3-propionyloxymercuri-2-methoxysulfolane,
3-butyryloxymercuri-2-methoxysulfolane,
3-chloromercuri-2-propoxybutyl 3-sulfolanyl ether.

Bactericidal and fungicidal compositions embodying the invention can be prepared in the form of solids or liquids. Solid compositions, preferably in the form of wettable powders, are compounded to give homogeneous free-flowing powder by mixing the active ingredient with finely-divided solids, Attaclays, diatomaceous earth, synthetic fine silica or flours derived from walnut shell, redwood, soybean, cotton seed flour, or other solid conditioning agents or carriers of the kind conventionally employed in preparing pest control compositions in solid form.

Bactericidal and fungicidal compositions embodying this invention can be prepared by incorporation of the active ingredients in paints (particularly water based paints), varnishes, and such vehicles as wax and paint emulsion preservatives. Further, the active ingredients divulged in this invention can be used in various industrial applications, such as in the pulp and paper industry for the control of papermill slime (algae). Further, the active ingredients disclosed in this invention can be used as disinfectants for domestic and industrial uses, such as in diaper disinfectants and disinfestants, wood preservative, mildew proofing of cotton cloth, and bacteriostat for textiles.

Even more preferably among solid composition, in some instances, are granules or pellets when the application is primarily to the soil. Granules may be prepared by impregnating granular diluents such as granular Attaclay, bentonite, or pelleted material or may be made by first extending powdered solid with powdered diluent and subsequently granulating. Pellets are made by extruding moistened, powdered mixtures under high pressure through dies.

Pesticidal spray compositions of the invention can be prepared by mixing the active ingredient with a suitable liquid diluent medium such as acetone, ether, benzene, or toluene or other solvents with low or high boiling points. The resulting composition is then in the form of either a solution or suspension of the active ingredient.

The pesticidal compositions of the invention, whether in the form of solids or liquids, for most applications may also include a surface-active agent of the kind sometimes referred to in the art as a wetting, dispersing or emulsifying agent. These agents, which will be referred to hereinafter more simply as surface-active agents, cause the compositions to be easily dispersed in water to give aqueous sprays, whereby they can be applied as dispersing liquid sprays or gas-propelled sprays.

The surface-active agents employed can be of the anionic, cationic or nonionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate and other wetting, dispersing and emulsifying agents such as those listed in articles by McCutcheon in "Soap and Chemical Specialties," vol. 31, Nos. 7–10 (1955), including for example, the material known as Triton X–155 (100% alkylaryl polyether alcohol, U.S. Patent No. 2,504,064).

Generally, the surface-active agent will not comprise more than about 1% to 10% by weight of the composition depending, of course, upon the particular surface-active agent, the system in which it is placed, and the result desired; in certain compositions, the percentage will be 1% or less. Usually, the minimum lower concentration will be 0.1%.

The active compound is, of course, applied in an amount sufficient to exert the desired pesticidal action. The amount of the active ingredient present in the compositions as actually applied for controlling the pests will vary with the manner of application, the particular pest for which control is sought, the purposes for which the application is being made, and like variables. In general, however, the biologically active formulation will contain from 5 p.p.m. to 625 p.p.m. of the active ingredient. Concentrations as low as 1 p.p.m. can be effectively employed against certain pathogens. For some requirements stronger concentrations may be desirable up to a maximum of 5000 p.p.m.

In some applications, rates of ½ pound to fifty pounds of mercurial sulfolane per acre (on an overall coverage basis) are suitable, with rates in the 0.1 to 10 pound range as a bactericide being preferred, and 0.5 to 20 pounds as a fungicide or algaecide per 100 gallons of aqueous diluent, also preferred. In the case of plant pathogens, the optimum rate will depend on soil type, pathogen, and host species, and degree of control required. If seed treatment, row treatment or spot treatment is used, the actual per-acre rates will be lowered, since the entire area is not permeated by the chemical but only the immediate vicinity of the seedlings.

Where the present sulfolane derivatives are to be incorporated into surface coatings, e.g. paints, the concentration will range from 0.05 to 0.2 pounds per gallon of liquid coating.

The methods of synthesis of the subject substituted mercurial sulfolanes are reported in the chemical literature, and do not form a part of the invention of the present disclosure. Loev, B., Journal of Organic Chemistry, 26 (1961) discloses general synthetic pathways for the preparation of mono- and disubstituted sulfolanes from sulfolene-3,4-chlorosulfolanol - 3, or 3 - allyloxysulfolane with the appropriate alcohol, thiol, or amine. Specifically included in the teaching of this paper are several of the advantageous and preferred compounds of this invention.

Various modifications and alterations of this invention will become apparent to those skilled in the art without departing from the scope and spirit of the invention, and it should be understood that the latter is not necessarily limited to the aforementioned disclosure.

FUNGICIDE TEST PROCEDURE.—(AGAR PLATE TESTS)

Example 1

Several representative species of fungi were grown five to seven days prior to use in each test. The standard in this test was Fermate.[1]

Media: Dextrin A—Potato Dextrose Agar (PDA), supplied by Difco Laboratories, Detroit, Mich., is used for the fungistatic test. Each medium is prepared according to manufacturer's instructions (39 grams PDA/liter). Nineteen milliliters of each medium are placed in 50 ml. test tubes, and sterilized by autoclaving for 15 minutes at 15 p.s.i.g.

Materials tested were prepared in concentrations of 625 p.p.m. (0.0625% w./v.). Four serial dilutions were made of 125, 25, 5 and 1 p.p.m. Acetone is used as solvent for the materials tested. To these solutions is added a non-ionic wetter, then made up to volume with distilled water.

One milliliter of solution or suspension from each of the above chemical dosage series is added to the 19 ml. of sterile media, shaken to disperse the chemical, then poured into sterile 90 millimeter (mm.) Petri dishes, and the mixture allowed to solidify. The final dosage-series for each chemical is 625, 125, 25, 5 and 1 p.p.m.

From the appropriate fungus cultures a 5 mm. disk is cut from the advancing margin and placed, mycelium down, on the surface of the agar of the test plate near the edge of the dish. Controls are included and each test is duplicated. Incubation temperature is 24° C.

Radical measurements are made for each fungus colony. The degree of fungistasis is determined by:

$$\text{Percent inhibition} = \frac{(\text{growth (mm.) on PDA}) - (\text{growth (mm.) on test chemical} + \text{PDA})}{\text{growth (mm.) on PDA}} \times 100$$

[1] Ferric dimethyl dithiocarbamate.

TABLE I.—FUNGICIDAL EFFICACY OF 3-ACETOXYMERCURI-2-METHOXYPROPYL-3-SULFOLANYL ETHER (SK & F 9577) AND 3-ACETOXYMERCURI-2-METHOXYSULFOLANE (SK & F 9709) ON REPRESENTATIVE FUNGI

[Agar plate test]

| Materials Tested | Dose | | Fungi, Percent Inhibition | | | | | | | |
|---|---|---|---|---|---|---|---|---|---|---|
| | Percent w./v. | P.p.m. | A. niger | Botrytis sp. | F. oxysporium lyc. | Rhizoctonia sp. | G. cingulata | H. sativum | R. stolnifer | Pythium sp. |
| SK & F 9577 | 0.0001 | 1 | 40 | 25 | 3 | 22 | 3 | 36 | 0 | 0 |
| | 0.0005 | 5 | 40 | 29 | 17 | 26 | 17 | 36 | 0 | 100 |
| | 0.0025 | 25 | 45 | 34 | 34 | 26 | 69 | 36 | 0 | 100 |
| | 0.0125 | 125 | 50 | 100 | 100 | 60 | 100 | 100 | 32 | 100 |
| | 0.0625 | 625 | 100 | 100 | 100 | 100 | 100 | 100 | 100 | 100 |
| SK & F 9709 | 0.0001 | 1 | 0 | 25 | 5 | 8 | 0 | 6 | 0 | 0 |
| | 0.0005 | 5 | 12 | 38 | 19 | 21 | 16 | 27 | 0 | 0 |
| | 0.0025 | 25 | 20 | 95 | 62 | 72 | 49 | 60 | 0 | 0 |
| | 0.0125 | 125 | 92 | 100 | 90 | 100 | 100 | 100 | 100 | 100 |
| | 0.0625 | 625 | 100 | 100 | 100 | 100 | 100 | 100 | 100 | 100 |
| Fermate (Ferric dimethyl dithiocarbamate). | 0.0005 | 5 | 61 | 85 | 65 | 68 | 100 | 50 | 100 | 100 |
| | 0.0025 | 25 | 72 | 85 | 80 | 68 | 72 | 70 | 100 | 100 |
| | 0.0125 | 125 | 100 | 100 | 100 | 82 | 100 | 100 | 100 | 100 |
| | 0.0625 | 625 | 100 | 100 | 100 | 100 | 100 | 100 | 100 | 100 |

BACTERICIDE TEST PROCEDURE.—AGAR PLATE TEST)

Example 2

Tow representative species of bacteria were cultured for 24 hours prior to use in each test. The standard in this test was Agrimycin.[2]

Media: Nutrient Agar (NA), supplied by Difco Laboratories, Detroit, Mich., is used for the bacteriostatic test. Each medium is prepared according to the manufacturer's instructions (23 g. NA/liter).

Nineteen milliliters (ml.) of each medium are placed in 50 ml. test tubes, and sterilized by autoclaving for 15 min. at 15 p.s.i.g.

Materials tested were prepared in fine concentrations ranging from 625 to 1 p.p.m. Acetone is used as solvent for the materials tested. To these solutions is added a non-ionic wetter, then made up to volume with distilled water.

One milliliter of solution or suspension for each of the above chemical dosage series is added to the 19 ml. of sterile media, shaken to disperse the chemical, then poured into sterile 90 millimeter (mm.) Petri dishes, and the mixture allowed to solidify. The final dosage-series for each chemical is 625, 125, 25, 5 and 1 p.p.m.

The bacteria are "seeded" by a single streak across the surface of the agar. Controls are included and each test is duplicated. Incubation temperature is 24° C.

Bacteriostatic effectiveness of each sulfolane is defined as that dosage which gives "complete" inhibition.

The results are shown in tabular form in Table II.

TABLE II.—BACTERICIDAL EFFICACY OF SK & F #9577 AND #9709 COMPARED TO A STANDARD BACTERICIDE ON TWO REPRESENTATIVE BACTERIA

[Agar plate test]

| Material tested | Dose | | Percent Growth Inhibition | | | |
|---|---|---|---|---|---|---|
| | P.p.m. | Percent w./v. | Erwinia carotovora | | Xanthomonas vesicatoria | |
| | | | 9577 | 9709 | 9577 | 9709 |
| SK & F Nos. 9577 and 9709. | 1 | 0.0001 | 100 | 0 | 100 | 0 |
| | 5 | 0.005 | 100 | 0 | 100 | 0 |
| | 25 | 0.025 | 100 | 100 | 100 | 100 |
| | 125 | 0.0125 | 0 | 100 | 0 | 100 |
| | 625 | 0.0625 | 100 | 100 | 100 | 100 |
| Agrimycin [1] (Standard) | 125 | 0.0125 | 100 | 100 | 100 | 100 |
| | 625 | 0.0625 | 100 | 100 | 100 | 100 |

[1] Streptomycin.

PATHOGENICIDE TEST PROCEDURE FOR ASPARAGUS STORAGE DECAY CONTROL

Three bundles, each containing ten-6″ asparagus spears, were dipped in both of the candidate chemicals in aqueous dispersion. They were: 3-acetoxymercuri-2-methoxy-propyl-3-sulfolanyl ether (SK & F #9577) at a concentration of 10 p.p.m.; and 3-acetoxymercuri-2-methoxysulfolane (SK & F #9709) at a concentration of 250 p.p.m. Both were compared to a dry check and a water check.

All bundles were stored and scored for degree of decay, at both three and four day intervals. The scoring consisted of grading each of the 30 spears for decay as follows:

<⅓ decayed=1 point
⅓–⅔ decayed=2 points
>⅔ decayed=3 points summing the 10 spear bundles a total score (poorest result possible would be a score of 90 for 3 bundles).

[2] Streptomycin.

The results are shown in Table III.

TABLE III.—AVERAGE DECAY SCORES

| Chemical | Average Score (Percent)[1] | |
|---|---|---|
| | 3 days | 4 days |
| SK& F #9577 | 21.1 | 37.8 |
| SK& F #9709 | 14.4 | 28.9 |
| Dry Check | 21.1 | 70.0 |
| Wet Check (Water) | 18.9 | 58.9 |
| 95% Confidence Limits[2] | 1.3 | 2.8 |
| L.S.D.[3] | 1.8 | 4.0 |

[1] These are per bundle averages expressed as a percentage of the maximum decay score of 30 points per bundle.
[2] These give limits on any single value in the column. Thus there is 95% confidence that the true 4-day mean of #9757 is in the range 37.8+2.8
[3] "Least Significant Difference" = the value which must be exceeded by the difference between any two averages in the column in order that they be judged significantly different.

It is apparent that both sulfolanes gave an economically significant improvement, particularly at the 4 days interval, where decay had begun to markedly accelerate in the checks over the preceding 24 hours.

What is claimed is:

1. A method for the inhibition and control of pests selected from the group consisting of *A. niger*, *Botrytis* sp., *F. oxysporium lyc.*, *Rhizoctonia* sp., *G. cingulata*, *H. sativum*, *R. stolonifer*, *Pythium* sp., *Erwinia carotovora* and *Xanthomonas vesicatoria*, which comprises applying to a pest infested material an effective amount of a compound in the form of an aqueous solution or suspension having the following formula:

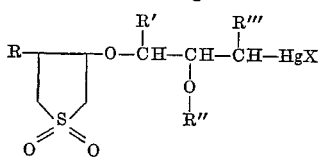

or

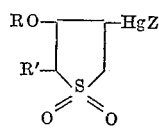

wherein:
R, R′, R″ and R‴ are selected from the group consisting of hydrogen and lower alkyl up to 5 carbon atoms,
X is an acid salt selected from the group consisting of halide, sulfate, acetate and benzoate, which amount is toxic to said pest, and
Z is selected from a group consisting of halo and acetoxy, propionyloxy and butyryloxy.

2. A method for the inhibition and control of fungi which comprises applying to a fungi infested material an effective amount of a compound in the form of an aqueous solution or suspension having the following formula:

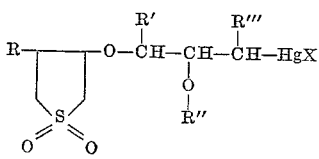

or

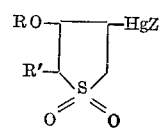

wherein:
R, R′, R″ and R‴ are selected from the group consisting of hydrogen and lower alkyl up to 5 carbon atoms, X is an acid salt selected from the group consisting of halide, sulfate, acetate and benzoate, and which amount is toxic to said fungi, and Z is selected from a group consisting of halo and acetoxy, propionyloxy and butyryloxy.

3. The method of claim 1 wherein the sulfolane mercurial is 3-acetoxymercuri-2-methoxypropyl 3-sulfolanyl ether.

4. A method for the inhibition and control of pests selected from the group consisting of *A. niger*, Botrytis sp., *F. oxysporium lyc.*, Rhizoctonia sp., *G. cingulata*, *H. sativum*, *R. stolonifer*, Pythium sp., *Erwinia carotovora* and *Xanthomonas vesicatoria*, which comprises applying to a pest infested material an effective amount of a compound in the form of an aqueous solution or suspension having the following formula:

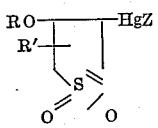

wherein:
R and R' are selected from the group consisting of hydrogen and lower alkyl up to 5 carbon atoms, and
Z is selected from a group consisting of halo and acetoxy, propionyloxy and butyryloxy.

5. A method for the inhibition and control of fungi which comprises applying to a fungi infested material an effective amount of a compound in the form of an aqueous solution or suspension having the following formula:

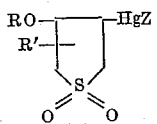

wherein:
R and R' are selected from the group consisting of hydrogen and lower alkyl up to 5 carbon atoms, and
Z is selected from a group consisting of halo and acetoxy, propionyloxy and butyryloxy.

6. The method of claim 5 wherein the sulfolane mercurial is 3-acetoxymercuri-2-methoxysulfolane.

7. A composition for the inhibition and control of fungi and bacteria selected from the group consisting of *A. niger*, Botrytis sp., *F. oxysporium lyc.*, Rhizoctonia sp., *G. cingulata*, *H. sativum*, *R. stolonifer*, *Erwinia carotovora* and *Xanthomonas vesicatoria*, comprising a compound having the following formula:

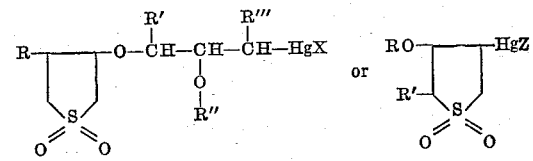

wherein:
R, R', R" and R'" are selected from the group consisting of hydrogen and lower alkyl up to 5 carbon atoms;
X is an acid salt selected from the group consisting of halide, sulfate, acetate and benzoate, and
Z is selected from the group consisting of halo, acetoxy, propionyloxy and butyryloxy;
said composition being in the form of a pellet or a liquid suspension comprising said compound, a liquid diluent, an emulsifying agent and a solid carrier; and said compound being present in said composition in the range of 1 to 5,000 parts per million.

8. A composition for the inhibition and control of fungi and bacteria selected from the group consisting of *A. niger*, Botrytis sp., *F. oxysporium lyc.*, Rhizoctonia sp., *G. cingulata*, *H. sativum*, *R. stolonifer*, *Erwinia carotovora* and *Xanthomonas vesicatoria* comprising a compound having the following formula:

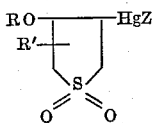

wherein:
R and R' are selected from the group consisting of hydrogen and lower alkyl up to 5 carbon atoms, and
Z is selected from the group consisting of halo, acetoxy, propionyloxy and butyryloxy;
said composition being in the form of a pellet or a liquid suspension comprising said compound, a liquid diluent, an emulsifying agent and a solid carrier, and said compound being present in said composition in the range of 1 to 5,000 parts per million.

References Cited

Loev, Journal of Organic Chemistry, vol. 26, November 1961, pp. 4394–4399.

ALBERT T. MEYERS, *Primary Examiner.*

J. D. GOLDBERG, *Assistant Examiner.*